US006201388B1

United States Patent
Pecheny et al.

(10) Patent No.: US 6,201,388 B1
(45) Date of Patent: Mar. 13, 2001

(54) DEVICE FOR DETERMINING THE ANGULAR POSITION OF A ROTATING MEMBER UTILIZING A MAGNETIC HALL EFFECT TRANSDUCER

(75) Inventors: Vladimir Pecheny, Rockford; George H. Anderson, Jr., Rockton, both of IL (US)

(73) Assignee: Invensys Building Systems, Inc., Loves Park, IL (US)

( * ) Notice: Subject to any disclaimer, the term of this patent is extended or adjusted under 35 U.S.C. 154(b) by 0 days.

(21) Appl. No.: 08/967,167

(22) Filed: Nov. 10, 1997

(51) Int. Cl.[7] .............................. G01B 7/14; G01B 7/30; G01R 33/06; H01L 43/06
(52) U.S. Cl. ................................. 324/207.2; 324/207.25
(58) Field of Search ........................... 324/207.2, 207.21, 324/207.25, 235, 251, 252; 338/32 R, 32 H

(56) References Cited

U.S. PATENT DOCUMENTS

| 3,162,804 | 12/1964 | Parson ..................................... 323/94 |
| 3,184,620 | * 5/1965 | Leibowitz et al. ................... 338/32 H |
| 3,365,594 | * 1/1968 | Davidson, Jr. ......................... 324/251 |
| 3,731,533 | 5/1973 | Geery ..................................... 73/231 |
| 4,392,375 | 7/1983 | Eguchi et al. ........................... 73/118 |
| 5,027,067 | 6/1991 | Witzig et al. ...................... 324/207.19 |
| 5,028,868 | 7/1991 | Murata et al. ...................... 324/207.2 |
| 5,126,663 | 6/1992 | Shinjo ................................ 324/207.2 |
| 5,148,106 | 9/1992 | Ozawa .............................. 324/207.21 |
| 5,237,272 | 8/1993 | Murata et al. ...................... 324/207.2 |
| 5,252,919 | 10/1993 | Uemura ............................ 324/207.25 |
| 5,528,140 | 6/1996 | Fuki et al. ......................... 324/207.12 |
| 5,544,000 | 8/1996 | Suzuki et al. ........................... 361/139 |
| 5,627,464 | 5/1997 | Shinjo et al. ....................... 324/207.2 |
| 5,789,917 | * 8/1998 | Oudet et al. ........................... 324/251 |

OTHER PUBLICATIONS

A High Linearity, Rotary Magnetic Sensor, Claude Oudet, Sensor Magazine, Jun. 1995, pp. 28–31.

* cited by examiner

Primary Examiner—Walter E. Snow
(74) Attorney, Agent, or Firm—David Barron; Jules Jay Morris; Terrence Martin

(57) ABSTRACT

An angular position sensor is couplable to an actuator for angular positional sensing of a shaft thereof. The sensor includes a base for mounting to the actuator. A diametrically magnetized permanent magnet ring is coupled to, and axially aligned with, the shaft. Further, a magnetic material cylindrical sleeve is coupled to the said base and disposed circumferentially around the magnet ring such that the sleeve is separated from said magnet ring by an air gap. A pair of diametrically opposing cylindrical segments are coupled to the sleeve by a circular support member and extend through the magnet ring. The cylindrical segments having a slot between them in which a hall effect transducer is disposed. The transducer senses the magnetic field flux of the magnet ring in the slot and thereby produces a signal indicative of the shaft's angular position.

14 Claims, 6 Drawing Sheets

DEVICE FOR DETERMINING THE ANGULAR POSITION OF A ROTATING MEMBER UTILIZING A MAGNETIC HALL EFFECT TRANSDUCER

TECHNICAL FIELD

The present invention relates, in general, to angular position sensors. More specifically, the present invention relates to an angular position sensor using a hall effect transducer.

BACKGROUND OF THE INVENTION

It is often desirable to know the angular position of a rotating member (e.g., a shaft). Such sensing is used in connection with a variety of rotary devices such as, for example, motors and actuators such that exact angular position thereof is determinable. As one example, in an application where an actuator controls a gaseous valve throttle opening or fuel pump rack position, angular position feedback is desirable such that a precise amount of admitted air or fuel is determinable. Further, an angular position feedback sensor is generally used to enhance the position-ability of the actuator it is affixed to using conventional closed-loop servo control techniques.

Several different technologies exist for angular position sensors. One particular technology used in many aggressive environments is magnetic sensing technology. Magnetic sensors are generally contactless and frictionless, and thus feature high reliability, long-life, and dirt and dust immunity.

Unfortunately, magnetic sensor technology suffers from linearity problems. These are due to the choice and configuration of magnetic circuit elements within the angular position sensor. A sensor having good linearity over a wide range of rotation has been long sought after.

The present invention is directed toward a solution to the above-identified problem.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

SUMMARY OF THE INVENTION

In a first aspect, the present invention includes an angular position sensor that is couplable to a device having a rotational member for angular position sensing thereof. The sensor includes a base, a permanent magnet ring, a magnetic material cylindrical sleeve, a pair of diametrically opposed cylindrical segments, and a transducer.

The base mounts to the device having the rotational member. The permanent magnet ring is coupled to, and axially aligned with the rotational member. Further, the magnet ring has an axial bore in it, and is diametrically magnetized between its north and south poles.

A magnetic material cylindrical sleeve is coupled to the base and is disposed circumferencely around the magnet ring such that the sleeve is separated from the magnet ring by an air gap. Further, the pair of diametrically opposed cylindrical segments are coupled to the cylindrical sleeve by a circular support member, and extend through the bore of the magnet ring. In particular, the cylindrical segments are arranged to have a diametrical slot extending between them.

The transducer is coupled to the cylindrical segments within the slot, and senses magnetic field flux of the permanent magnet ring within the slot. The magnetic field flux corresponds to the angular position of the rotational member thereby facilitating angular position sensing.

As an enhancement, the sensor may also include a cylindrical flange that couples the permanent magnet ring to the rotational member. Also, the base may have a bore in it, wherein the rotational member extends into the bore. Further, the cylindrical flange may extend over the rotational member and into the bore of the base.

As a further enhancement, a cylindrical sleeve support may couple the cylindrical sleeve to the base. The sleeve support may be adjustably coupled to the base for alignment thereof. In particular, multiple set-screws may be circumferencely disposed around the sleeve support and tightenable into the base. The screws overlap a flange of the sleeve support to adjustably couple the sleeve support to the base.

As a further enhancement, the cylindrical support member may include a circular cap disposed over the cylindrical sleeve. The cap may have an axial bore in it which defines an inside surface thereof. The cylindrical segments are secured to this inside surface.

Further, regarding the cylindrical support member, it may include an outer annular flange overlapping, and disposed circumferencely around, the cylindrical sleeve. Also, the outer annular flange may have a threaded bore therein which accommodates a set-screw to facilitate calibration of the sensor through rotation of the cylindrical support member.

The above-described sensor may be used in combination with an actuator having a shaft as a rotational member. The base of the sensor is mounted to the actuator such that the output from the transducer corresponds to an angular position of the actuator's shaft.

DESCRIPTION OF A PREFERRED EMBODIMENT

Figure 1:
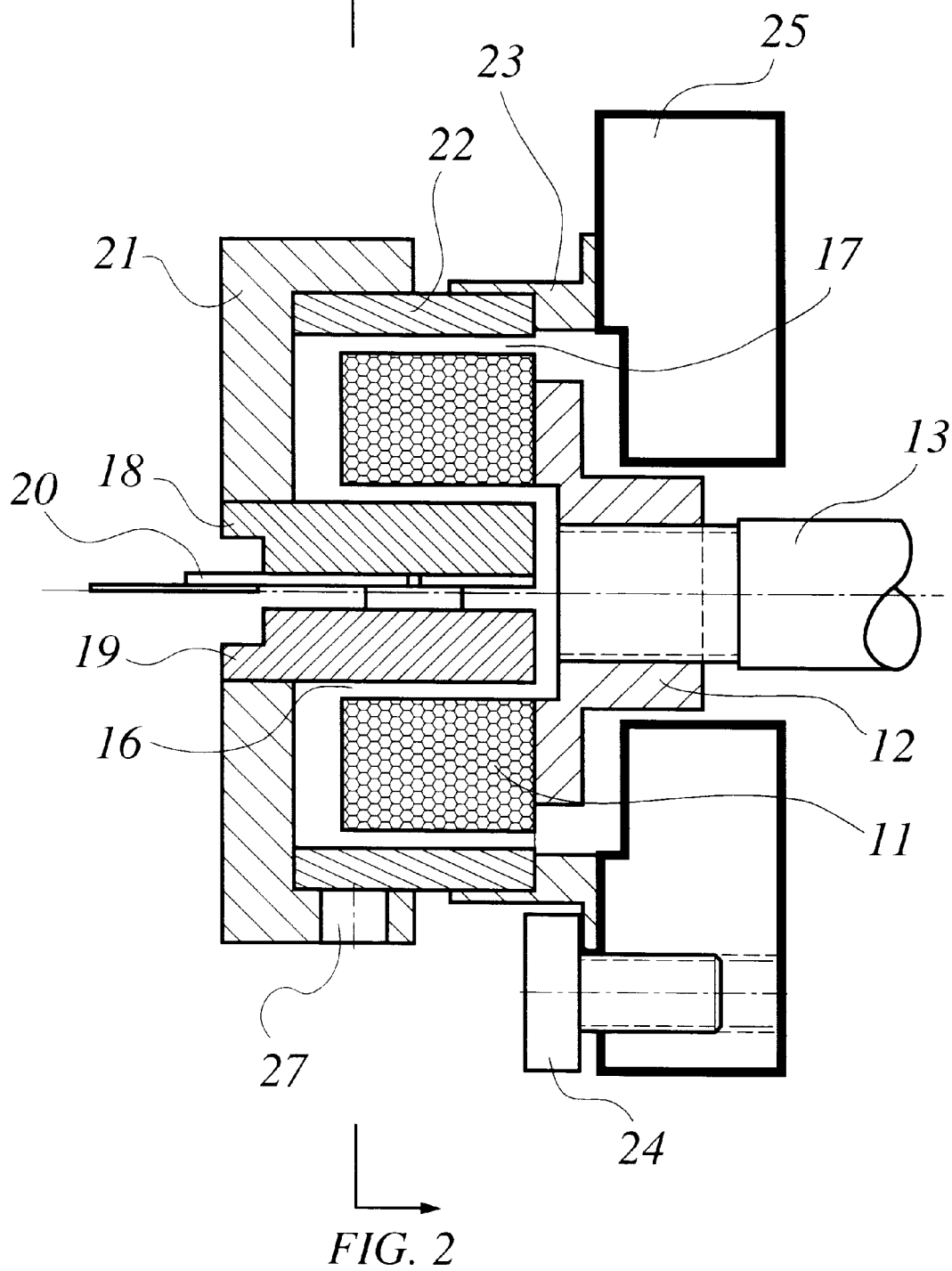
FIGS. 1–2 depicts cross-sectional views of an angular position sensor pursuant to one embodiment of the present invention.
Figure 2:
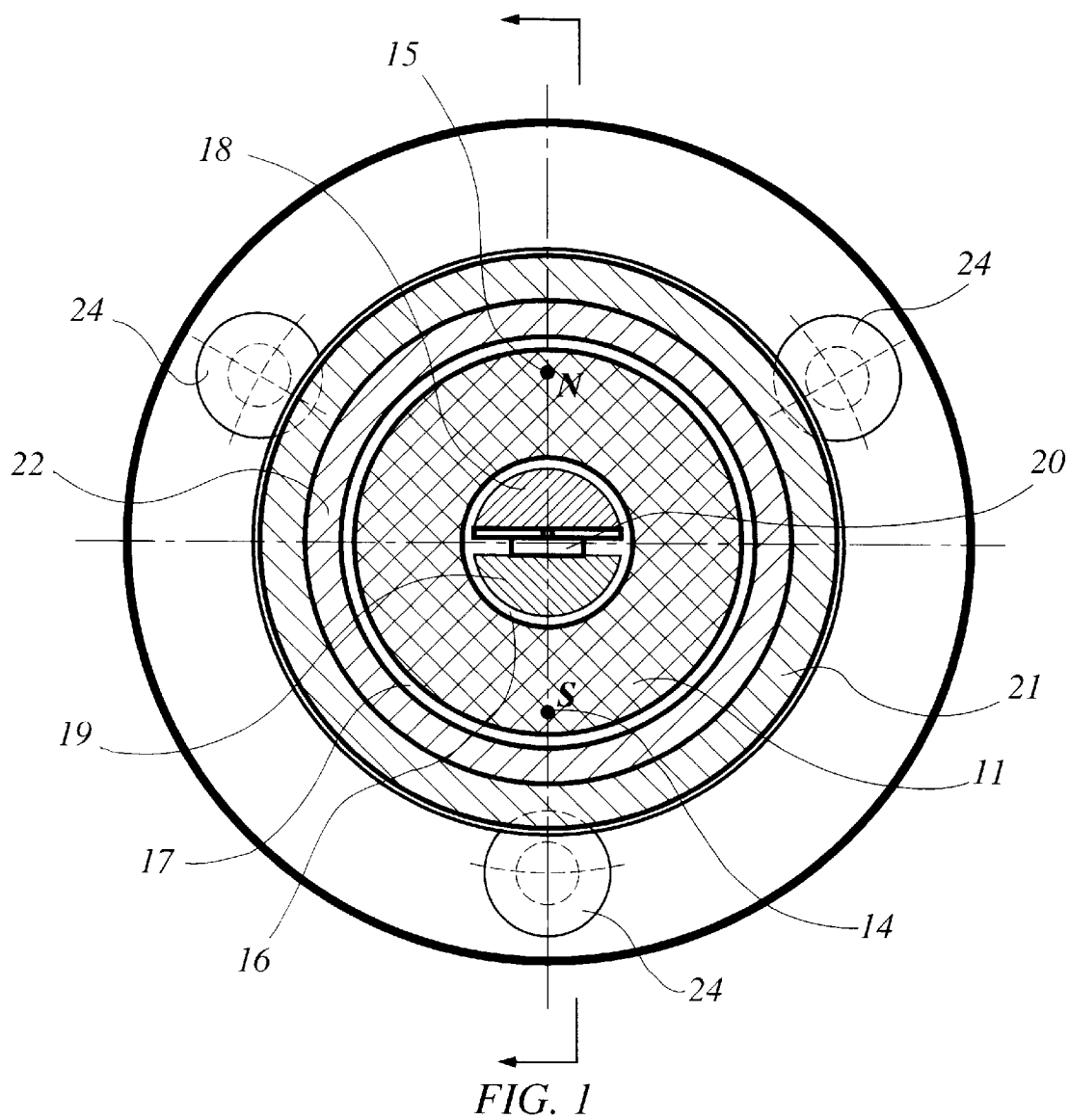

In accordance with the present invention, an angular position sensor is described herein which features improved linearity over a wide range of rotation. Turning to the cross-sectional views of FIGS. 1–2, angular position sensor 10 ("sensor") is depicted.

Sensor 10 is mountable onto a device for angular position sensing thereof using a base 25. In particular, the position of a rotational member (e.g. shaft 13) of the device is sensed. Shaft 13 extends through a bore in base 25 into sensor 10.

Mounted to base 25 is an operationally static, but alignable assembly, which includes a cylindrical, non-magnetic material sleeve support 23, mounted to base 25 using a set-screws 24. Alignment of sensor 10 is facilitated by set-screws 24.

Base 25 may be a discrete base, or may be a portion of an actuator or other assembly that sensor 10 is mounted to. That is, for example, in one embodiment, base 25 may be a portion of an actuator housing appropriate sized such that sleeve support 23 may attach thereto using set screws 24.

As used herein, the terms non-magnetic and magnetic are used to describe materials that are non-magnetizable and magnetizable, respectively. For example, non-oriented silicon steel or iron materials would be considered magnetic materials, while non-iron (aluminum) or plastic materials would be considered non-magnetic materials.

To continue, a magnetic material cylindrical sleeve 22 is attached to sleeve support 23 and is aligned coaxial therewith. Sleeve 22 may be formed from, for example, steel. A non-magnetic material cylindrical housing 21 is concentrically fastened about sleeve 22, and is affixed thereto using a set-screw 27 (which facilitates calibrating sensor 10).

An axial bore is disposed in cylindrical housing 21 (i.e., a circular support) and its inside surface serves as a mount for a pair of magnetic material cylindrical segments 18 and 19. These segments are oriented such that their flat surfaces are in opposing parallel relation to each other and their arc surfaces are mounted to an inside surface of the bore in housing 21. Thus, there is a diametrically symmetrical slot between the flat surfaces of segments 18 and 19.

As one example, segments 18 and 19 may be dimensioned such that the resulting slot therebetween has a gap of, for example, 1.85 millimeters.

Disposed within the slot, and attached to the flat surfaces of segments 18 and 19 is a hall effect transducer 20. As one example, hall effect transducer 20 may be a model SS94A2D hall effect transducer from MicroSwitch, Inc.

Taken together, base 25, sleeve support 23, sleeve 22, housing 21, segments 18 and 19, and hall effect transducer 20 are rigidly mounted to the device whose rotational member's (e.g., shaft 13) angular position is to be sensed.

The rotational components of sensor 10 include shaft 13, a non-magnetic material flange 12, and a permanent magnet ring 11. More particularly, flange 12 is axially mounted onto shaft end 13. Also, permanent magnet ring 11 is mounted to flange 12 such that it rotates coaxially with shaft 13. Accordingly, rotation of shaft 13 is directly translated into angular motion (rotation) of permanent magnet ring 11.

Regarding the magnetic circuit of sensor 10, permanent magnet ring 11 has a north pole 15 (FIG. 2) and a south pole 14 and is diametrically magnetized therebetween. Further, segments 18 and 19 are symmetrically placed around the central axis of stationary cylindrical housing 21 and are identically fabricated. As discussed above, inside the diametrical slot between segments 18 and 19 is hall effect transducer 20, which is only sensitive the magnetic field flux flowing perpendicular to, and between, the flat surfaces of segments 18 and 19.

Advantageously, modern magnetization techniques facilitate high quality diametrical magnetization of permanent magnet ring 11. Highly uniform diametrical magnetization of the ring is achievable for all of the permanent magnet ring. That is, a full 360 degrees of the magnet ring can be diametrically magnetized without any null zones. As a result of this, in combination with those techniques disclosed herein, the sensor output is proportional to rotational position, and thus has high accuracy. Non-diametrical permanent magnet ring magnetization techniques suffer from deficiencies in uniformity and completeness of magnetization. For example, current radial magnetization techniques result in significant null zones that would degrade performance of sensor 10 if incorporated therein.

Continuing with the description of the magnetic circuit, the free space between permanent magnet ring 11 inside diameter and arc surfaces of segments 18 and 19 is a first radial air gap 16 of sensor 10. First radial air gap 16 has constant radial size (e.g., 0.635 mm) during the rotation of permanent magnet ring 11.

Sleeve 22 is located around permanent magnet ring 11 and captures the inner magnetic flux around permanent ring 11, and further magnetically screens the inner magnetic field from stray magnetic fields (e.g. from a nearby actuator).

The free space between permanent magnet ring 11 outside diameter and sleeve 22 inside diameter is a second air gap 17 of sensor 10. Second air gap 17 has constant radial size during the rotation of permanent magnet ring 11 (e.g., 0.787 mm).

Figure 3:
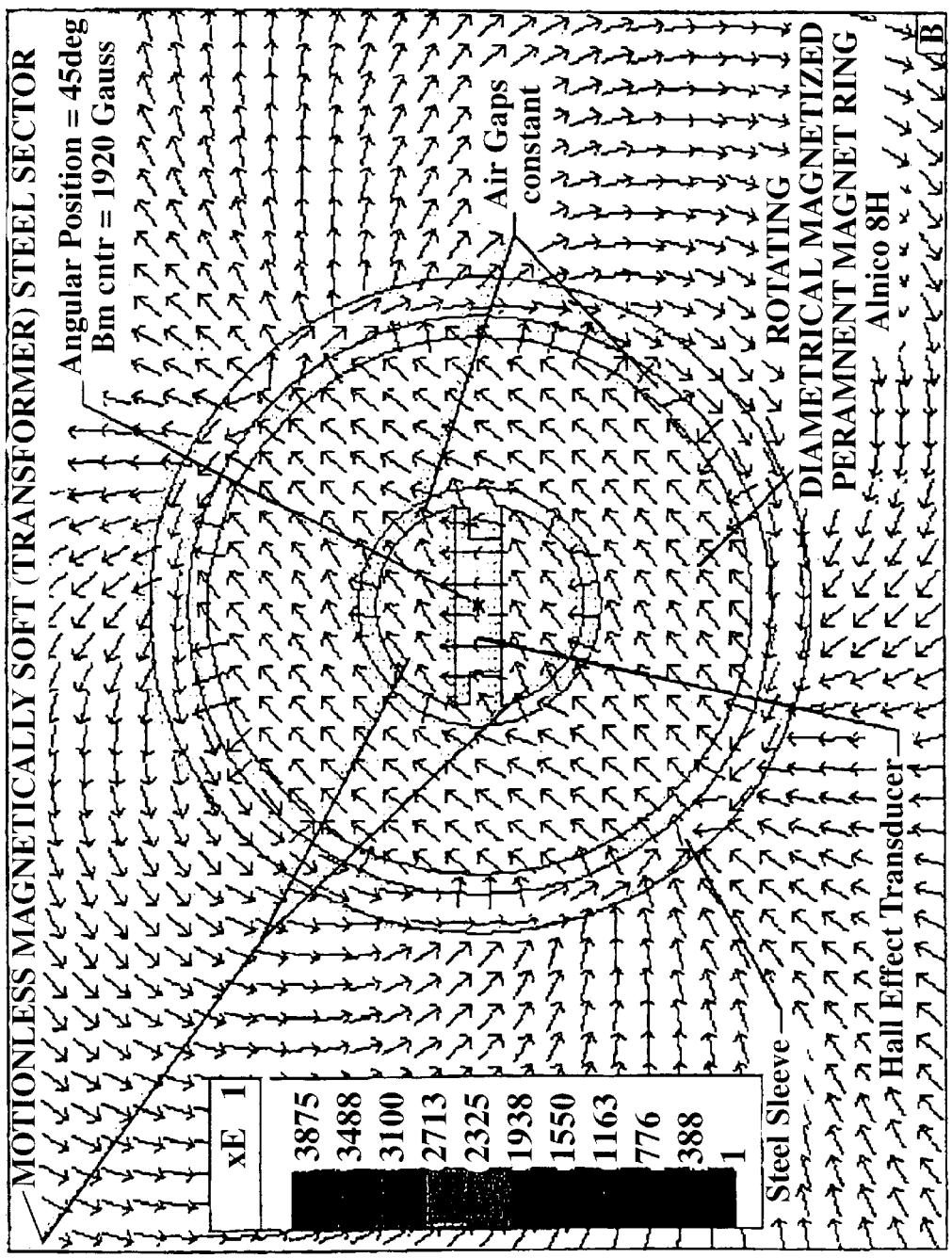
FIGS. 3–4 depict computer simulated magnetic flux diagrams corresponding to the angular position sensor of FIGS. 1–2 at different angular positions thereof.
Figure 4:
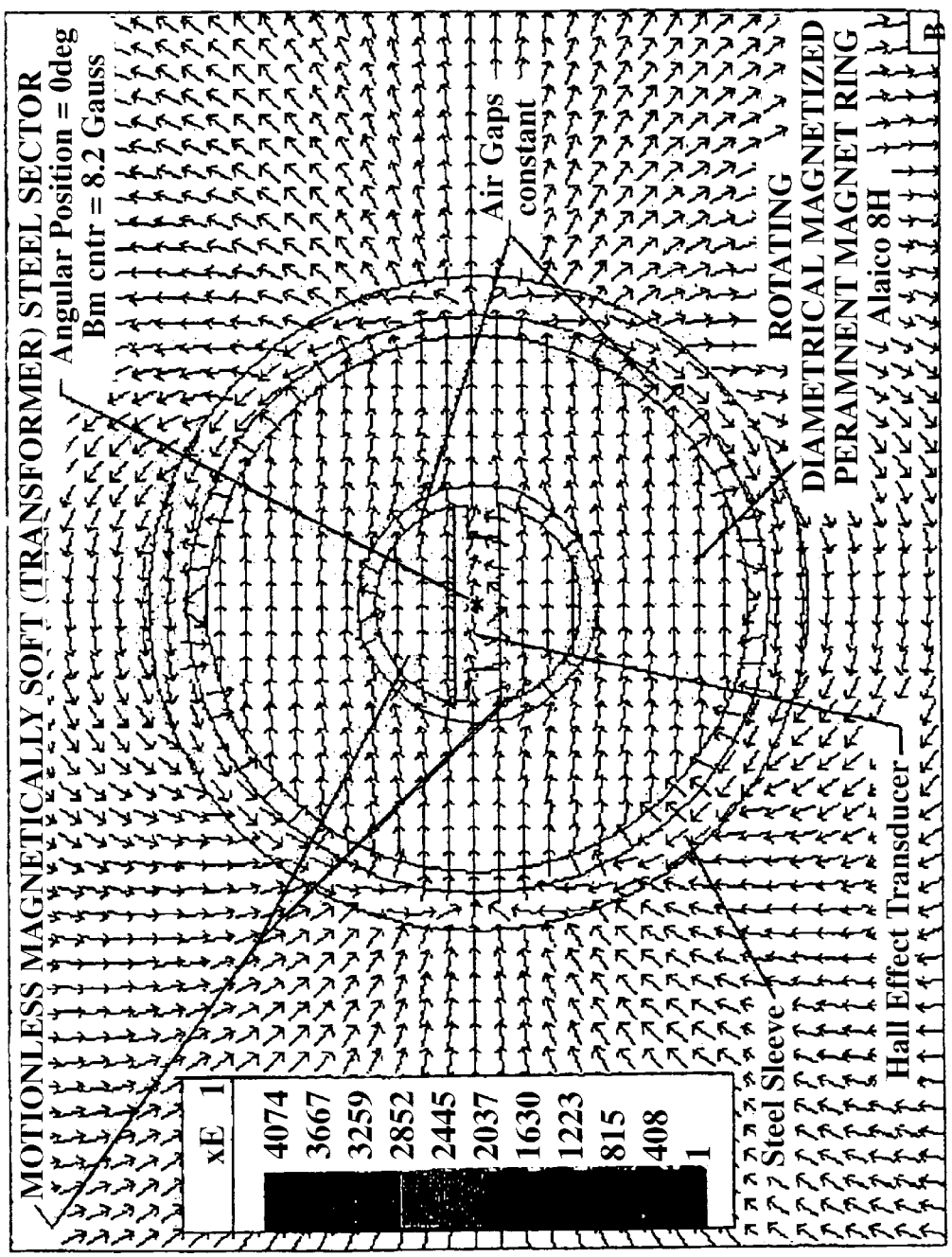

The magnetic circuit of the present invention is more particularly described in terms of an inner magnetic circuit and an outer magnetic circuit which relate to the magnetic flux from permanent magnet ring 11 inwards and permanent magnet ring 11 outwards, respectively (see, e.g., FIGS. 3–4).

Regarding the inner magnetic circuit, permanent magnet ring 11 has a north pole 15 and a south pole 14 which generate a magnetic field inside and around permanent magnet ring 11. The magnetic field extends in a direction perpendicular to the central axis of sensor 10. The magnetic flux lines having incidence with the inner diameter surface of permanent magnet ring 11 cross first air gap 16 with radial direction. After radially passing through first air gap 16, the magnetic flux lines cross segment 18 in a direction parallel to the diametrical magnetic flux lines inside permanent magnet ring 11.

The magnetic flux lines crossing the flat surface of cylindrical segment 18 have a direction perpendicular thereto. Thus, these flux lines intersect hall effect transducer 20 at a constant angle of 90 degrees. The density of these flux lines is directly proportional to the angular position of sensor 10 (i.e., the rotational position of permanent magnet ring 11).

The magnetic circuit is symmetrical, thus, the magnetic flux lines inside cylindrical segment 19 and the area of air gap 16 in proximity thereto have the same density, but opposite polarity, to those flux lines described above with regard to cylindrical segment 18.

Regarding the outer magnetic circuit, all magnetic flux lines which have incidence out of permanent magnet ring 11 outer diameter surface or incidence inward with the inner diameter of sleeve 22, pass through second air gap 17 with radial direction to the axis of sensor 10. These flux lines close to either north pole 15 or south pole 14 of permanent magnet ring 11 through sleeve 22.

Operationally, as shaft 13 rotates, flange 12 with permanent magnet ring 11 attached thereto also rotates. During rotation, the direction of the magnetic flux within cylindrical segments 18 and 19 changes, maintaining alignment with the diametrical flux of permanent magnet ring 11. Also during rotation, the overall direction and density of magnetic flux lines inside air gaps 16 and 17 will not change (within the linear operating range of sensor 10 i.e., within +/−45 degrees around the zero output point of sensor 10).

Even further during rotation, the magnetic flux line density passing between the flat surfaces of cylindrical segments 18 and 19 changes in accordance with the rotational position of permanent magnet ring 11. However, the direction of flux passing between the flat surfaces of cylindrical segments 18 and 19 is constantly perpendicular to the flat surfaces thereof, thereby passing through hall effect transducer 20. As a result, the hall effect transducer 20 produces an output voltage that is proportional to magnetic flux density between cylindrical segments 18 and 19. Accordingly, for a 90 degree range, the output voltage of hall effect transducer 20 is linearly proportional to rotational position.

Depicted in FIGS. 3–4 are two operational states of sensor 10 during rotation of permanent magnet ring 11. As illustrated, magnetic flux direction inside the slot (between segments 18 and 19) is not changed during the rotation of permanent magnet ring 11. However, the magnetic flux distribution (i.e., flux density) passing through hall effect transducer 20 is changed during the magnetic field rotation and has high linearity relative to the rotational position of permanent magnet ring 11. FIG. 3 depicts a rotational position wherein transducer 20 is intersected by significant flux density, while FIG. 4 depicts the zero output point of sensor 10.

Figure 5:
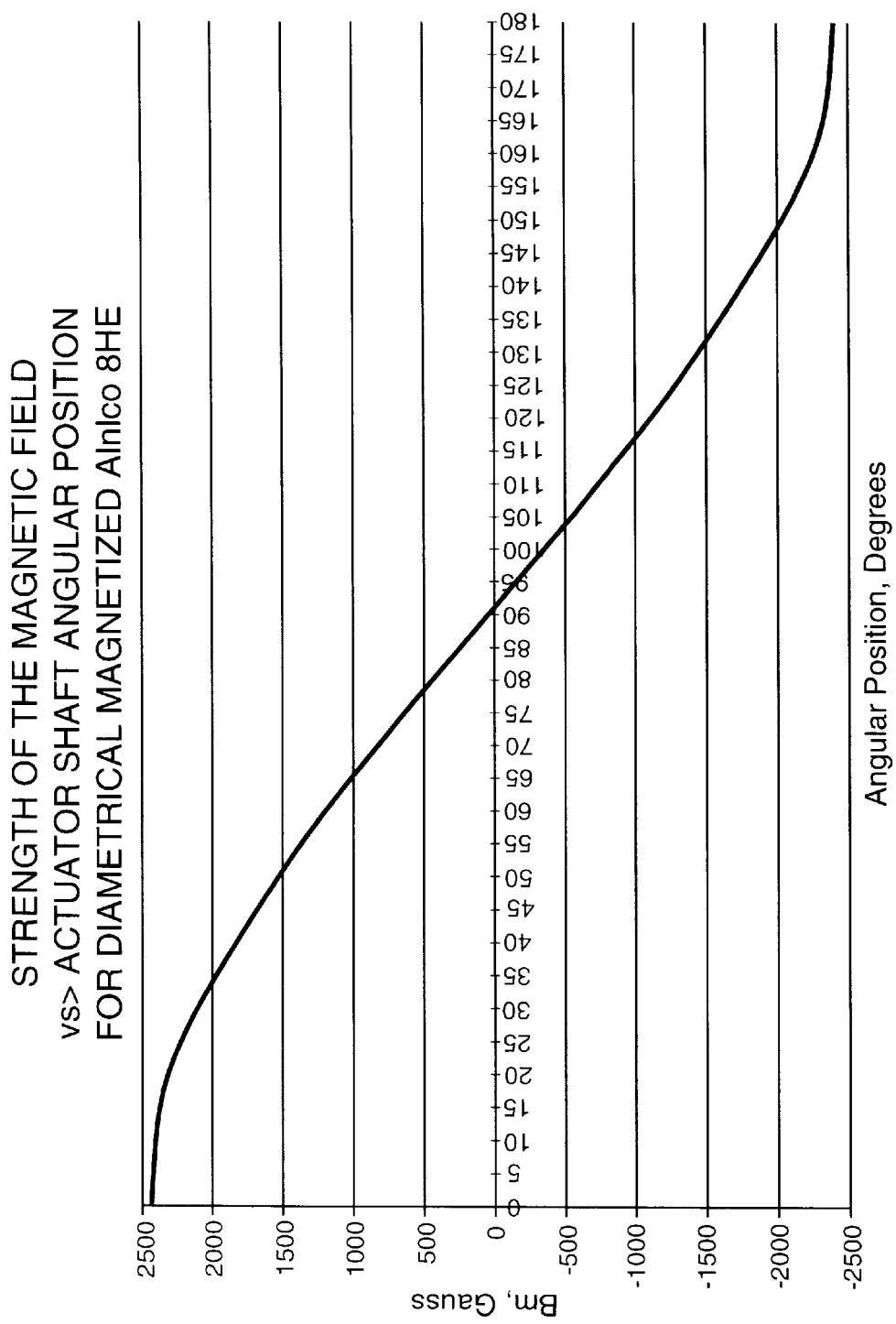
FIGS. 5–6 are graphs of exemplary performance data for the actuator of FIGS. 1–2.

The graph of FIG. 5 depicts the flux density imposed upon hall effect transducer 20 throughout rotation of permanent magnet ring 11. This simulation was performed using the Boundary Element Methods in the "Oersted 2.5/Magnito 3.0" program from Integrated Engineering Software Co. of Canada. As can be seen from the graph, a region exhibiting a high degree of linearity exists in the 90-degrees surrounding the "physics" point (i.e., where magnetic flux flowing through hall effect traducer 20 has a zero gauss level).

Figure 6:
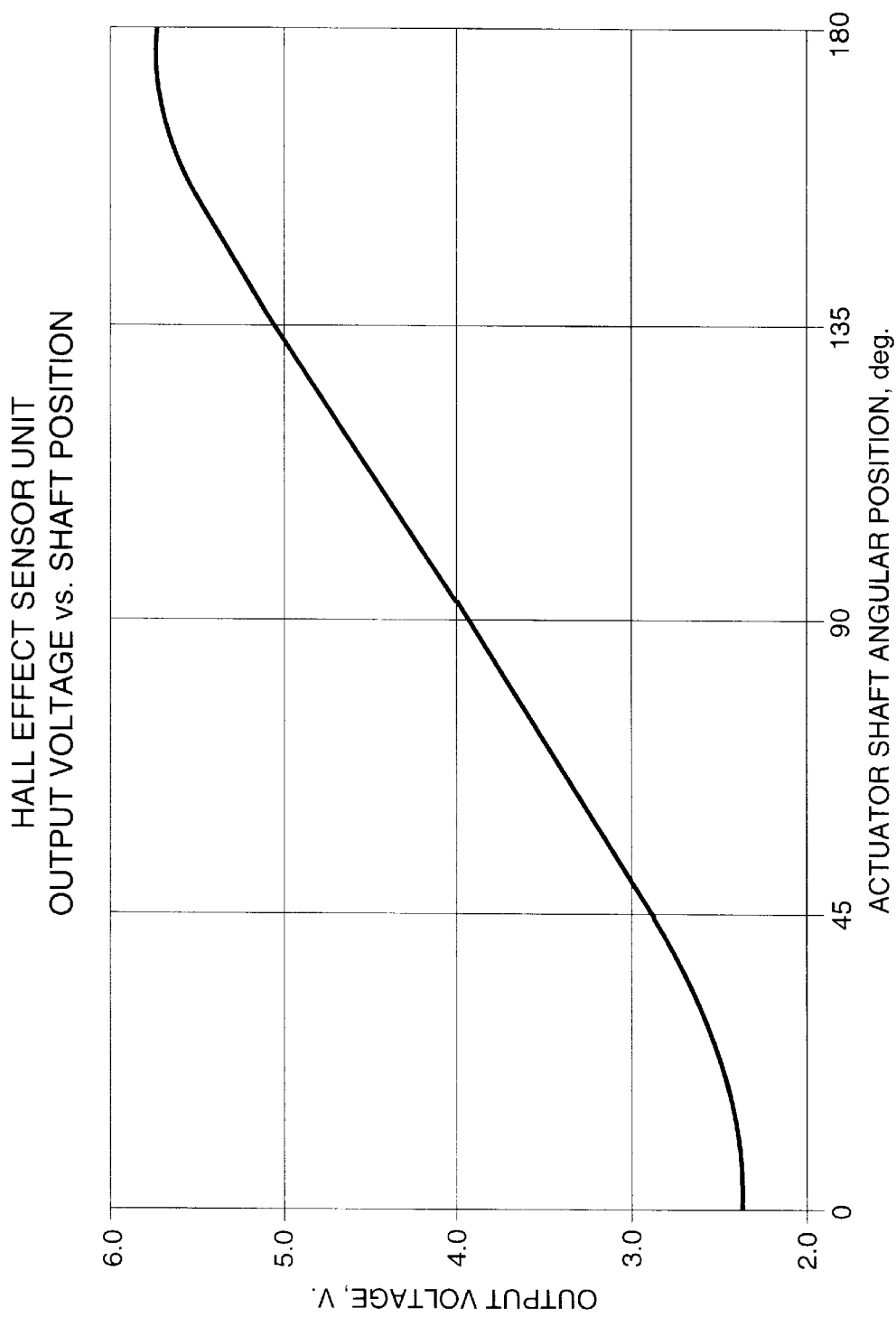

Depicted in FIG. 6 is a graph illustrating hall effect transducer 20 output verses rotational permanent magnet ring 11 position. This data was determined during testing of the sensor depicted in, for example, FIGS. 1–2. In particular, linearity of the output signal is maintained within 0.95 percent in the 90-degrees of rotation surrounding the "physic" point of sensor 10 (i.e., 90 degrees on the graph).

Alignment and calibration of sensor 10 is facilitated using set-screws 24 and set-screw 27, respectively. During initial assembly, sleeve support 23 and those components mounted thereto (sleeve 22, cylindrical housing 21, and cylindrical segments 18 and 19) are attached to base 25 using set-screws 24. This subassembly is aligned to be concentric with the axis of permanent magnet ring 11 as attached to sleeve support 22 and shaft 13.

Calibration is achieved by rotationally aligning cylindrical housing 21, cylindrical segments 18 and 19 and hall effect transducer 20 attached thereto with the permanent magnet ring 11 as attached to sleeve support 12 and shaft 13. Thus, when shaft 13 is at a predetermined position, hall effect transducer 20 will have the desired output. Set-screw 27 is then tightened in the desired position for the calibration needed.

Advantageously, the stray magnetic field generated by the actuator to which the sensor was attached during testing had no measurable effect on linearity. Also, temperature drift was measured at 0.5 percent for the temperature range of −40° to +125° Celsius.

In accordance with the present invention, various magnetic and non-magnetic materials may be used as disclosed herein. In a preferred embodiment, permanent magnet ring 11 may be composed of PLASTIFORM brand, ALNICO-8H molded magnet material from ARNOLD ENGINEERING Co.; cylindrical segments 18 and 19 may be composed of M19 steel (Fi-3.75% Si) or 1215 steel; cylindrical sleeve 22 may be composed of 1215 steel; and the other (i.e., non-magnetic material) elements may be composed of 2011-T3 aluminum alloy.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

We claim:

1. An angular position sensor couplable to a device for angular positional sensing of a rotational member thereof, said sensor comprising:

a base for mounting to said device;

a permanent magnet ring coupled to, and axially aligned with, said rotational member, said magnet ring having an axial bore therein and being diametrically magnetized between a north pole and a south pole thereof;

a cylindrical sleeve coupled to said base and disposed circumferentially around said magnet ring such that said sleeve is separated from said magnet ring by an air gap;

a pair of diametrically opposed cylindrical segments coupled to said cylindrical sleeve by a circular support member and extending through said bore of said magnet ring, said cylindrical segments having a diametrical slot extending therebetween; and a transducer coupled to at least one of said cylindrical segments within said slot for sensing magnetic force of said permanent magnet ring therein to facilitate said angular positional sensing;

a cylindrical flange coupling said permanent magnet ring to said rotational member;

wherein said base has a bore therein, and wherein said rotational member extends at least into said bore;

wherein a cylindrical sleeve support couples said cylindrical sleeve to said base; and wherein said cylindrical sleeve support is adjustably coupled to said base.

2. The sensor of claim 1, wherein said cylindrical flange comprises non-magnetic material.

3. The sensor of claim 1, wherein said cylindrical flange extends over said rotational member and into said bore.

4. The sensor of claim 1, wherein said base comprises non-magnetic material.

5. The sensor of claim 1, further comprising a plurality of set-screws tightenable into said base, circumferentially disposed around said sleeve support, and overlapping a flange thereof so as to adjustable couple said sleeve support to said base.

6. The sensor of claim 1, wherein said cylindrical sleeve support comprises non-magnetic material.

7. The sensor of claim 1, wherein said circular support member comprises non-magnetic material.

8. The sensor of claim 1, whereas said base comprises a portion of said device.

9. The sensor of claim 1, wherein said device comprises an actuator and wherein said base comprises a portion of said actuator.

10. An angular position sensor couplable to a device for angular positional sensing of a rotational member thereof, said sensor comprising:

a base for mounting to said device;

a permanent magnet ring coupled to, and axially aligned with, said rotational member, said magnet ring having an axial bore therein and being diametrically magnetized between a north pole and a south pole thereof;

a cylindrical sleeve coupled to said base and disposed circumferentially around said magnet ring such that said sleeve is separated from said magnet ring by an air gap;

a pair of diametrically opposed cylindrical segments coupled to said cylindrical sleeve by a circular support member and extending through said bore of said magnet ring, said cylindrical segments having a diametrical slot extending therebetween; and a transducer coupled to at least one of said cylindrical segments within said slot for sensing magnetic force of said permanent magnet ring therein to facilitate said angular positional sensing; and wherein said circular support member comprises a circular cap disposed over said cylindrical sleeve and having an axial bore therein defining an inside surface thereof, said cylindrical segments being secured to said inside surface.

11. The sensor of claim 10, wherein said circular support member further comprises an outer annular flange overlapping, and disposed circumferentially around, said cylindrical sleeve.

12. The sensor of claim 11, wherein said outer annular flange has a threaded bore therein, said threaded bore accommodating a set-screw to facilitate calibration of said sensor.

13. The Sensor of claim 10, wherein said rotational member comprises a shaft.

14. The sensor of claim 13, further in combination with an actuator having said shaft said base being mounted to said actuator such that output from said transducer corresponds to an angular position of said actuator.

* * * * *